3,038,867
AQUEOUS PAPER FURNISH COMPRISING A DE-AERATED DISINTEGRATED UREA-FORMALDE-HYDE RESIN FOAM AND PROCESS OF MAKING SAME
Thomas P. Czepiel, Media, Pa., assignor to Scott Paper Company, Chester, Pa., a corporation of Pennsylvania
No Drawing. Filed Oct. 22, 1959, Ser. No. 847,869
8 Claims. (Cl. 260—2.5)

The present invention relates to fibrous composites embodying distintegrated aminoplast foamed resins and more particularly to physical modifications of such resins whereby their compatability with the other materials forming the fibrous composites is greatly improved.

The present invention particularly includes paper, paperboard and pulp stocks composed of disintegrated urea-formaldehyde foamed resin in admixture with cellulosic fibrous materials of the kind normally employed in the manufacture of felted or sheeted paper products.

Paper, as it is generally known today, is composed of matted or felted cellulosic fibers, such as those obtained from wood, cotton, bagasse and similar vegetable sources. For certain special applications, a portion of the papermaking cellulosic fibers may be replaced by mineral fibers, for example, vitreous fibers, or filaments of synthetic resins generated by a wet-spinning process, including such materials as regenerated cellulose, cellulose acetate, polyesteramides, polynitriles, acrylonitriles, polyvinyl acetate-chloride copolymers and the like. These heterogeneous stocks are, for the most part, limited in their compositions by the ability of the substituted ingredients to fibrillate under the mechanical action of beating in order to increase the bonding forces between fibers, although in some cases bonding agents may be included in the stock or with some synthetic resin filaments, a heat treatment after web formation can result in a physical union of the fibers.

The usual fiber found in a paper stock, whether mineral, vegetable or synthetic resin is uni-axial or uni-dimensional in character, wherein the ratio of length to diameter or width has an order of magnitudes of from 10 to 1 to 100 to 1. The geometry of these fibers and the mechanics by which they are formed into paper naturally tends to make the preponderance of the fiber axes assume such positions that they lie in the plane of the resultant sheet with, of course, some overlapping and/or interlacing. Where it has been desired to modify the physical aspects of the paper, slurries of greater density may be utilized to form a thicker sheet and with less compression during drying a bulkier product is enabled. Creping of the sheet as it is removed from the machine or an embossing, scoring or perforating step during finishing operations will also serve to disrupt the normal uni-planar sheet formation.

Many resins have been used as paper additives. Some have been incorporated into the pulp in an intermediate stage of formation in order that post curing will impart wet strength, flame proofing, grease resistance and comparable characteristics to the ultimate products. Also some cured resins, in the form of discrete particles have been employed as fillers. More recently it has been discovered that certain synthetic resins can be converted into semi-rigid foams, with cellular structures exhibiting useful characteristics. A urea-formaldehyde prepolymer, for example, formed by condensing urea and formaldehyde in an approximate 1 to 2 molar ratio may be foamed by addition to a cellulated mass of a surface active agent, water and an acid catalyst such as sulfuric acid. Regulation of the density of the cellulated matrix by aeration thereof enables control of the density of the resin foam within limits of from 0.2 to 0.8 pound per cubic foot. Additionally it has been noted that the degree of aeration and matrix agitation affects the fineness of the ultimate foam which can have as many as $10^5$ cells per cubic centimeter. Upon curing and drying there will be observed some regulable collapse or reticulation of the cell structure leaving a skeletal configuration composed of rod-like strands and assemblies, which under agitation may be distintegrated into fragments, segments and cell residues of various degrees of complexity. Melamine-formaldehyde resins, mixed melamine-urea-thiourea condensation products with formaldehyde and phenol-formaldehyde resins may be similarly processed to produce lightweight foams. Other foamed resins are disclosed in U.S. Patents Nos. 2,273,367, 2,384,387 and 2,559,891 and British Patents Nos. 768,562 and 773,809.

The foamed resins, described above, are first disarranged by simple grinding, wet or dry, to produce angulate fibrous resin fragments comparable in size to the pulp fibers with which they are to be blended. The extent to which the foam distintegration is carried on is somewhat dependent upon the grade of paper to be made from the mixture of disintegrated foamed aminoplast and papermaking fibers. For instance in the case of a fine texturized tissue a more severe grinding is preferred than in the case of an industrial wiping paper where an intermediate degree of material reduction is preferred. Preferred operative sizes of the disintegrated resin fall within range of .05 mm. to 4.0 mm., but sizes both above and below these dimensions can be used, and are to be selected depending upon type of composite paper product desired.

Distintegration of the resin foam may also be effected in conventional Hydrapulpers, beaters, Jordans, fiberizing disc mills and the like, equipment usually employed in the preparation of wood fiber pulps. The degree of distintegration, deagglomeration or foam fracture again will depend upon the nature of the apparatus utilized and the time of exposure. Manifestly, vigorous agitation under increasing increments of loading will result in more disintegration than would be possible when operating at reduced loadings for short periods of time. It is, of course, possible to effect the simultaneous deagglomeration of the resin foam with the beating of the wood pulp and the blending of the cellulosic and resin components preliminary to the sheet formation.

The type as well as the amount of uni-axial fibers with which the distintegrated resin foam is combined may be varied within wide limits as desired and will, of course, also have a bearing upon the nature of the ultimate paper which is formed. As little as 1% of resin foam will have a noticeable effect upon the physical properties of the paper in which it is incorporated. Cellulosic fibers from soft and hard woods, bagasse, bamboo, and cotton are suitable source materials and the treatment thereof may include sulfite, sulfate, semi-chemical as well as chemi-mechanical pulping. Where a wood pulp is employed, groundwood pulps are quite appropriate. Although mineral fibers can replace a portion of the cellulosic fibers in the base pulp, it is preferred that these be in the minority in order to obviate the need of special bonding additives in the final sheet. Similarly, the presence of a small percentage of uni-axial filaments of a spun synthetic resin is also contemplated. It is preferred, however, that uni-axial cellulosic fibers constitute the major portion of the paper stock, although as much as 50% by weight of such stock may be composed of the distintegrated resin foam.

The composite mixture of disintegrated aminoplast resin foam and pulp fibers, when used for the purpose of papermaking, requires almost continuous and vigorous agitation in order to prevent material stratification and loss of homogeneity because of the differences in physical characteristics and in particular the apparent densities of such components. This behavior presents serious problems in the handling of the stock, its storage in chests, movement throughout the stock preparation system as well as its ability to produce a well formed homogeneous sheet on the paper machine.

A principal object of the present invention is to provide for the modification of a disintegrated aminoplast resin foam in order that its admixture with a paper stock will enable formation of a stable, homogeneous composition.

A further object of my invention is the provision of a paper furnish containing a disintegrated aminoplast resin foam exhibiting resistance to component separation.

A still further object of this invention is to provide a paper furnish containing a disintegrated aminoplast resin foam which may be conveniently handled in known types of papermaking equipment without extensive apparatus modification.

Other objects and advantages of my invention will be readily apparent from the following detailed description of certain preferred embodiments thereof.

Briefly stated the present invention contemplates the treatment of disintegrated aminoplast resin foam in aqueous suspension, either before or after its combination with pulp fibers in order to dislodge or release entrained air therefrom, to effect replacement of such air with water, to change the sedimentation characteristics of the foam and to increase the compatability of the foam with said pulp fibers.

The invention will be particularly described with reference to the following examples which are intended for purposes of illustration only.

*Example 1*

A urea-formaldehyde foamed structure was prepared according to the teachings of Belgian Patents Nos. 527,694, 565,130 and 569,190.

This foamed structure was then cured by heating for 2½ hours in an oven at 90° C.

This structure was disintegrated in a hydraulic shear pulper of the Cowles type for 45 seconds at 1.7% consistency. The material was then blended with a bleached sulfite pulp from western hemlock, which had been beaten to 400 Canadian standard freeness, in the ratio of 25% disintegrated foamed structure to 75% wood pulp.

The combined furnish was run on a cylinder paper machine to produce a machine glazed sheet with a basis weight of 20 pounds per ream. The running behavior of the machine was very poor and foam separation became apparent almost immediately in the chest, mixing well and cylinder vat. The machine ran for only five minutes without producing rejectable paper, under conditions found suitable for the continuous indefinite running of the wood pulp alone.

With conditions such that agitation was increased throughout the paper machine system, i.e. speeding up of the agitation in the chest, lowering the level in the cylinder vat, removal of all baffles, etc., continuous running was possible for a period of ½ hour, at which time the paper formation became poor, and finally a shut down was required to remove floating foam from the system.

*Example 2*

A disintegrated foamed resin structure was prepared as in Example 1. This material was diluted to a 0.22% consistency, transferred to a closed vessel, and while under vigorous agitation, a vacuum of 17 inches of mercury was applied and released through 8 cycles over a period of 3 hours. This de-aerated material was blended with a wood pulp as in Example 1 and the paper furnish run on a cylinder machine. Machine glazed paper with a basis weight of 21.1 pounds/ream (2880 sq. ft.) was prepared with good formation and uniformity over a continuous 8 hour period of operation with no apparent separation of foam in any segment of the machine system.

*Example 3*

A disintegrated foamed resin structure, prepared as in Example 1, was de-aerated at 0.37% consistency under 21 inches of vacuum for 1 hour employing 5 cycles of vacuum application and release. A furnish containing 28% disintegrated foam and 72% of wood pulp was handled without difficulty on the cylinder machine over a period of 8 hours. Similarly, a furnish containing 40% of this disintegrated foam in combination with 60% of wood pulp was converted into paper of uniform characteristics with no apparent separation of foam or loss of homogeneity in the furnish.

*Example 4*

A spray dried urea-formaldehyde resin, commercially available as Synolit 192–II from the Vereinigte Chemische Fabriken, Vienna, Austria, was foamed according to the teachings of Belgian Patents 527,694, 565,130 and 569,190. The resultant foam was cured in an oven at 70° C. for 2½ hours after which it was disintegrated by agitation for 5 minutes in a Noble & Wood cycle beater (unloaded) to a consistency of 0.37%. Following de-aeration as in Example 3, the disintegrated foam was introduced into a paper furnish containing 69% wood pulp and converted into a machine glazed paper having a basis weight of 21.2 pounds/ream. The paper machine was run for 8 hours without difficulty.

*Example 5*

A foam prepared as in Example 4 was stored at 30° C. for a period of 90 minutes before disintegration in a Cowles hydraulic shear for 45 seconds to a consistency of 2.2%. De-aeration was conducted with vigorous agitation for a period of 1 hour employing 4 cycles to a maximum vacuum of 22 inches of mercury at 0.35% consistency. A paper furnish composed of 32% of disintegrated foam and 68% of wood pulp was run on a cylinder machine equipped with a doctor blade on the Yankee Drier section. Paper toweling with a basis weight of 21.5 pounds/ream, 8% crepe and uniform consistency was produced continuously for a period of 8 hours with no appearance of material separation in any portion of the machine system.

*Example 6*

A foam prepared as in Example 4 was cured by heating to 100° C. for a period of 4 hours prior to its disintegration in a Hydrapulper at 0.1% consistency for 0.5 hour. On dewatering to 0.4% consistency the disintegrated foam was de-aerated employing 3 cycles of application and release of a vacuum of 22 inches of mercury over 45 minutes accompanied by vigorous agitation. The de-aerated foam was blended with a bleached sulfite pulp from western Hemlock, previously beaten to 420 Canadian standard freeness, in the proportions of 30% foam to 70% wood pulp. The paper furnish produced high quality creped paper toweling with a basis weight of 22 pounds/ream and 15% of crepe. No apparent material separation was observed during a continuous operating period of 8 hours and even with complete stagnation in the stock chest, due to deliberate stoppage of the agitator, there was no flotation of the disintegrated resin foam.

The foregoing results indicate that resin inclusions intended to impart special beneficial properties to paper furnishes and the resultant sheeted paper are facilitated by de-aeration of the resin component and the subsequent handling of the paper furnishes is simplified by such de-aeration. The vacuum treatment of the disintegrated resin foam may be accomplished at room or elevated temperatures and de-aeration may also be assisted by the addition of surfactant agents of the anionic, cationic, or non-ionic types to the resin foam suspension. Substantially complete elimination of entrained air from the disintegrated resin foam insures stability thereof in aqueous dispersion and precludes flotation separation of such foam.

It will be obvious that other variations in the procedural details leading toward foam de-aeration are possible without departing from the spirit of the present invention or the scope of the appended claims.

What I claim is:

1. A paper furnish comprising a de-aerated disintegrated urea-formaldehyde resin foam in aqueous suspension.

2. A paper furnish comprising a de-aerated disintegrated urea-formaldehyde resin foam and cellulosic pulp fibers in aqueous suspension.

3. A paper furnish comprising from 1 to 50% by weight of a de-aerated disintegrated urea-formaldehyde resin foam and from 99 to 50% by weight of wood pulp fibers in aqueous suspension.

4. A paper furnish comprising from 25 to 35% by weight of de-aerated fragments of disintegrated urea-formaldehyde resin foam and from 65 to 75% by weight of wood pulp fibers in aqueous suspension, said furnish being stable, homogeneous and being particularly resistant to material stratification.

5. A process of preparing a stable, homogeneous aqueous suspension of disintegrated urea-formaldehyde resin foam and wood pulp fiber which comprises de-aerating, under vacuum, the disintegrated resin foam and dispersing the de-aerated resin foam with wood pulp fiber in aqueous suspension.

6. The process as defined in claim 5 in which the foam de-aerating is accompanied by vigorous agitation.

7. The process as defined in claim 5 in which the foam de-aeration is effected by repeated and alternated vacuum applications and releases.

8. A process of preparing a stable, homogeneous, aqueous suspension of angulate fragments of disintegrated urea-formaldehyde resin foam and wood pulp fiber which comprises de-aerating by repeated and alternated vacuum applications and releases the disintegrated resin foam, such de-aeration being accompanied by vigorous agitation, and dispersing the de-aerated resin foam with wood pulp fiber in aqueous suspension.

References Cited in the file of this patent

UNITED STATES PATENTS

| | | |
|---|---|---|
| 2,016,199 | Howald | Oct. 1, 1935 |
| 2,178,358 | Howald et al. | Oct. 31, 1939 |
| 2,601,598 | Daniel et al. | June 24, 1952 |
| 2,757,086 | Morse | July 31, 1956 |